United States Patent [19]

Mukaemachi et al.

[11] 4,076,971
[45] Feb. 28, 1978

[54] SUBSCRIBER LINE TESTING SYSTEM

[75] Inventors: Takuji Mukaemachi; Yutaka Fukushima, both of Yokohama, Japan

[73] Assignee: Hitachi, Ltd., Japan

[21] Appl. No.: 721,216

[22] Filed: Sep. 8, 1976

[30] Foreign Application Priority Data

Sep. 12, 1975 Japan .............................. 50-111489
Dec. 30, 1975 Japan .............................. 50-158563
Dec. 30, 1975 Japan .............................. 50-158564

[51] Int. Cl.² .............................................. H04B 3/46
[52] U.S. Cl. ........................... 179/175.3 R; 179/18 A
[58] Field of Search ................ 179/175.3 R, 175.2 R, 179/175.2 D, 18 R, 18 A, 18 AA

[56] References Cited

U.S. PATENT DOCUMENTS 3,891,838  6/1975  Herr et al. .................... 179/175.2 R Primary Examiner—Douglas W. Olms
Attorney, Agent, or Firm—Craig & Antonelli

[57] ABSTRACT

A testing system for testing an impedance of a subscriber line by connecting a test circuit to the subscriber line through one of channels in a network including current self-holding semiconductor switching devices, wherein a series circuit of a second channel and a constant current source is connected in parallel with said first-mentioned channel whereby the current self-holding semiconductor switching devices in said first and second channels are kept conductive by said constant current source.

8 Claims, 11 Drawing Figures

FIG. I (a)
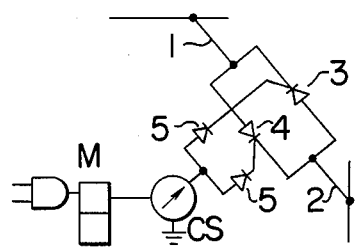
FIG. I (b)
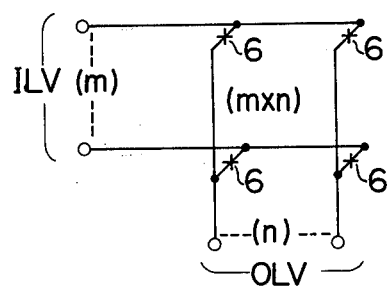
FIG. I (c)
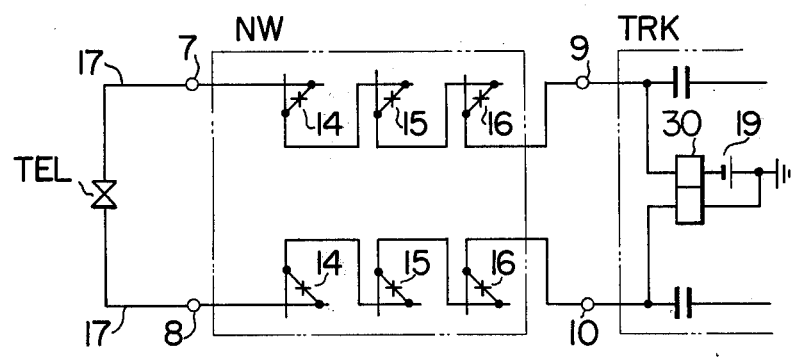

SUBSCRIBER LINE TESTING SYSTEM

The present invention relates to a subscriber line testing system in a space division telephone exchange equipment including crosspoint switches such as thyristors.

With the recent development of a semiconductor integrated circuit technology, a telephone exchange equipment with a space division channel network using semiconductors as switching devices has been developed. Various combinations of the devices involved and the types of channel have been proposed for the space division channel network. Of those, a system for directly coupling a subscriber line to a trunk circuit by a channel network without the intervention of a subscriber transformer like a convention mechanical switching system has been proposed, in which four-layer or multi-layer semiconductor switching devices such as thyristers are used as the switching devices and the switching device is kept conductive so long as a gate current flows through a gate of that switching device from a gate driving constant current circuit. In this type of channel, since the channel is kept even when a subscriber closed loop current is zero, e.g., in case of dialing, hooking or power supply reversal in the trunk circuit, the gate current of the thyristor in that channel can be supplied even after the closure of the channel while not relying merely on the self-holding property of the thyristor. However, since the gate current after the closure of the channel flows into the channel, it adversely affects a test for the subscriber line in which a small current is treated. More particularly, because of the self-holding property, the thyristor can be self-held by a channel current after the termination of the gate drive current, but when a small current in the order of a micro-ampere to milli-ampere is treated e.g. in case of the subscriber line test (such as resistance measurement, capacitance measurement or external current measurement), it is not possible to self-hold the thyristor because the magnitude of the small current is smaller than that of the current required to self-hold the thyristor. For this reason, an approach is adopted in which the gate driving current is passed to hold the channel and the subscriber line and the subscriber line test circuit are connected together. In this case, however, when it is attempted to test the subscriber line in a conventional manner, the test is not impossible or a considerable error is involved in the measurement because of the addition of the gate drive current flowing into the subscriber line. Accordingly, such a test system may not be applicable.

It is an object of the present invention to provide a subscriber line testing system in a telephone exchange equipment using semiconductor crosspoint switches, which has eliminated the drawback of the prior art described above and which assures as high accuracy and operability as in a prior art system using mechanical crosspoints.

Briefly, a feature of the present invention resides in the fact that a series circuit of a channel established by a channel network and a constant current source is connected in parallel with a testing channel which leads a subscriber line to be tested in a subscriber station into a measuring circuit, to form a closed loop, and the both channels are self-held and subsequently gate drive current at the crosspoint is cut-off to conduct the test of the subscriber line.

In accordance with one aspect of the present invention, a closed loop is formed between an interrupting test vertical which leads a subscriber line to be tested in a subscriber station into a measuring circuit and a channel established by a channel network, the channels are self-held by a floating power supply, and then gate drive current at the crosspoint is cut-off to conduct the test of the subscriber line.

In accordance with another aspect of the present invention, a subscriber line to be tested is connected to a measuring circuit by two interruption-connected channels, i.e. connecting paths for establishing double connections between a talking subscriber and a test subscriber line, across which a constant current source is connected, to form a closed loop, the channels are self-held by the constant current source, and then gate drive current at the crosspoint is cut-off to conduct the test of the subscriber line.

In accordance with a further aspect of the present invention, a local cell comprising diode, thyristor or the like is cascade-connected to a subscriber line test circuit in a direction to cancel a forward voltage drop across a crosspoint switching device for compensating for the forward voltage drop in a testing channel.

The above and other objects, features and advantages of the present invention will become more apparent from the following description of the preferred embodiments of the invention when taken in conjunction with the accompanying drawings, in which:

FIG. 1(a) shows a circuit diagram of a semi-conductor switching device.

FIG. 1(b) shows a circuit diagram of an $m \times n$ switching matrix using the semiconductor switching devices.

FIG. 1(c) shows a configuration of a channel network using the switching matrix.

Figure 2A:
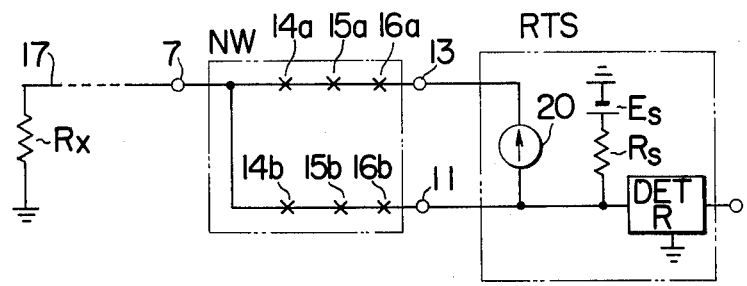
Figure 2B:
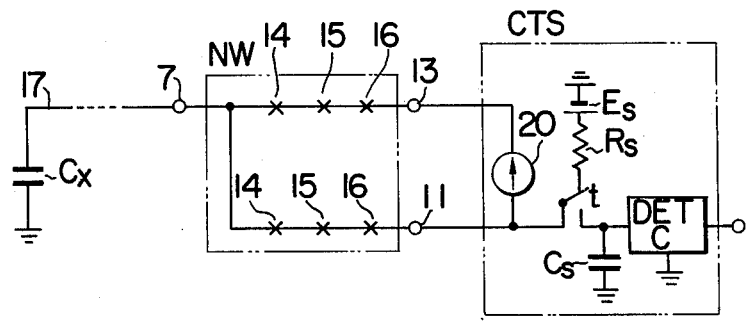
Figure 2C:
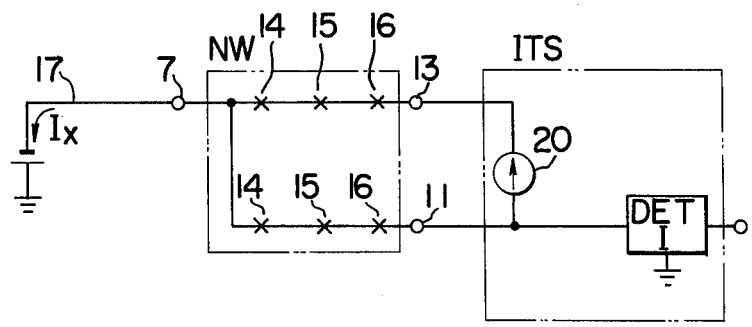

FIGS. 2(a) through (c) illustrate a first embodiment of the present invention, in which FIG. 2(a) is a circuit diagram for a resistance measurement, FIG. 2(b) is a circuit diagram for a capacitance measurement, and FIG. 2(c) is a circuit for measuring an external current measurement.

Figure 3A:
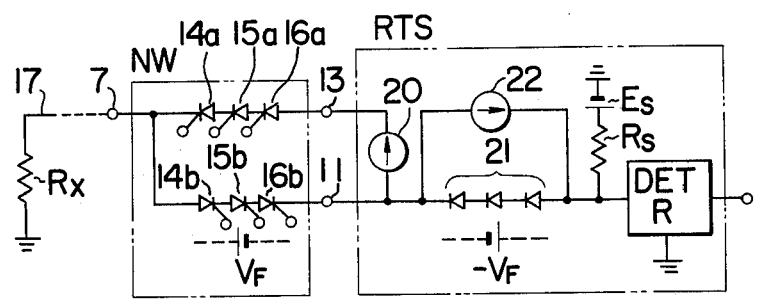
Figure 3B:
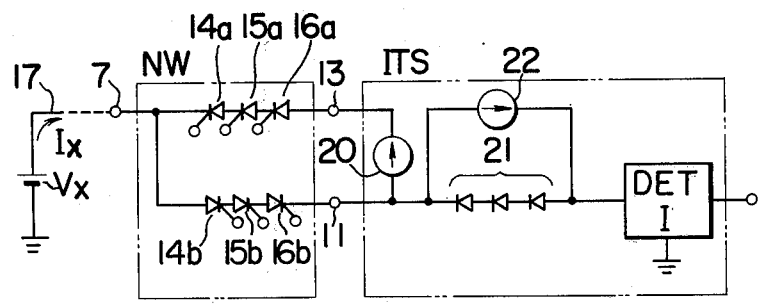

FIGS. 3(a) and (b) illustrate another embodiment of the present invention in which FIG. 3(a) is a circuit diagram for a resistance measurement and FIG. 3(b) is a circuit diagram for an external current measurement.

Figure 4A:
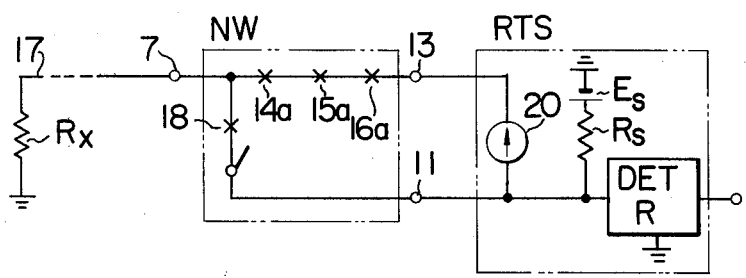
Figure 4B:
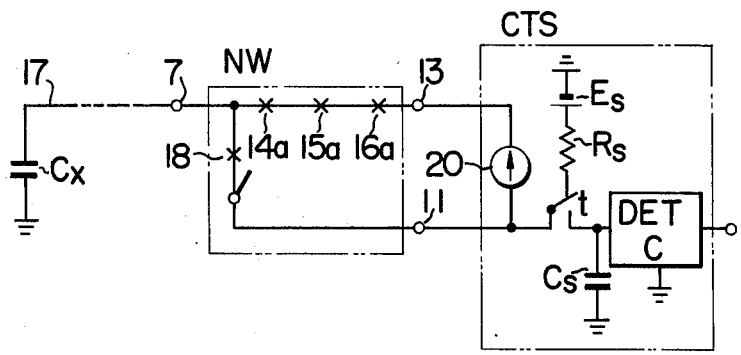
Figure 4C:
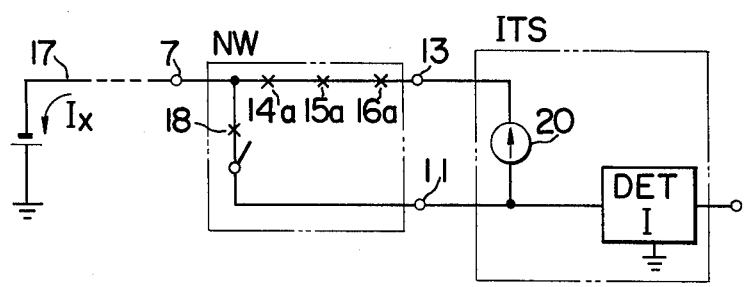

FIGS. 4(a) through (c) show another embodiment of the present invention in which FIG. 4(a) is a circuit diagram for a resistance measurement, FIG. 4(b) is a circuit diagram for a capacitance measurement, and FIG. 4(c) is a circuit for an external current measurement.

Referring now to FIG. 1(a) which shows a circuit diagram of one crosspoint of a bilateral semiconductor switching device used in the embodiments of the present invention, an incoming line 1, an outgoing line 2, crosspoint thyristors 3 and 4, diodes 5 for preventing back current from flowing into the gates of the crosspoint thyristors 3 and 4, a constant current drive circuit CS for driving the gates of the crosspoint thyristors 3 and 4, and a memory M for holding the constant current drive circuit CS during the establishment of a channel, are shown therein.

FIG. 1(b) shows a circuit diagram of a matrix switching circuit in which the semiconductor switching devices as shown in FIG. 1(a) are arranged in $m \times n$ matrix, wherein 6 designates the semiconductor switching device shown in FIG. 1(a), ILV designates $m$ incoming level terminals, and OLV designates n outgoing level terminals.

FIG. 1(c) shows an embodiment of a channel system of a telephone exchange equipment including three stages of channel network NW comprising the switching matrixes as shown in FIG. 1(b), in which the channel network NW directly couples a telephone set TEL to a trunk circuit TRK. In FIG. 1(c), 7 and 8 designate line terminals of the channel network, 9 and 10 designate trunk terminals, 14, 15 and 16 designate crosspoints of first, second and third stages, respectively, 17 a subscriber line, 30 a winding of a relay for supplying a channel current, and 19 a battery.

When a holding memory at a desired crosspoint is set by a control unit not shown, the constant current drive circuit CS is actuated to supply a drive current to a gate of either crosspoint thyristor 3 or 4 depending on the cathode potential thereof. The drive current is generally in the order of 0.1 – 2 mA although it varies with the gate sensitivity of the crosspoint thyristors 3 and 4. Thus, as a result of the conduction of the crosspoints 14 to 16 in the channel network NW in FIG. 1(c), the channel current flows through a route of ground-winding 30 of a relay for supplying channel current-trunk terminal 10-crosspoints 16-15-14-subscriber terminal 8-telephone set TEL-subscriber terminal 7-crosspoints 14-15-16-trunk terminal 9-winding 30 of relay for supplying channel current-battery 19, for completing the channel path.

In the telephone exchange equipment as shown in FIG. 1(c), when the subscriber line 17 is to be tested, it is a common practice to connect a testing circuit to the trunk terminal of the channel network NW and connect the trunk terminal and a line terminal connected to the subscriber line 17 to be tested through the testing channel path in the channel network NW. While it is possible to self-hold the thyristor by the channel current after the gate drive current has terminated because of the self-holding function of the thyristor, it is impossible to self-hold the thyristor when a small current in the order of a micro-ampere to a milli-ampere is treated e.g. in case of the subscriber line test (resistance measurement, capacitance measurement, external current measurement, etc.) because the self-hold current for the thyristor exceeds the current flowing through the crosspoint. Accordingly, in the past, the gate drive current was passed even during the subscriber line test to hold the channel for connecting the subscriber line with the subscriber line testing circuit. However, this method had a drawback that the test cannot be conducted or a considerable error was involved in the measurement because of the addition of the gate drive current.

FIGS. 2(a) through (c) show a first embodiment of the present invention which has overcome the above drawback, in which FIG. 2(a) shows a circuit diagram for a resistance measurement, FIG. 2(b) shows a circuit for a capacitance measurement and FIG. 2(c) shows a circuit for an external current measurement.

Referring first to FIG. 2(a), the resistance measurement of the subscriber line is explained. In FIG. 2, 11 and 13 designate testing terminals to which a line test trunk for resistor measurement RTS is connected. The line test trunk RTS comprises a floating constant current circuit 20 for self-holding crosspoint, a measuring reference voltage source $E_S$, a reference resistor $R_S$ and a detector DETR, which is a D.C. voltage detector in a specific embodiment. $R_X$ designates a resistor to be measured and it corresponds to an insulation resistance of the subscriber line 17.

The operation of FIG. 2(a) is now explained. A terminal 7 of the subscriber line to be tested is dual-connected to the terminals 11 and 13 of the line test trunk through crosspoints 14a, 15a, 16a and 14b, 15b, 16b of the channel network NW and the floating constant current circuit 20 is actuated to conduct the holding current through the thyristors at the crosspoints in a closed loop of constant current circuit 20-terminal 13-crosspoints 16a-15a-14a-crosspoints 14b-15b-16b-terminal 11-constant current source 20.

Then, the gate drive to the thyristors at the crosspoints 14a to 16b is stopped and the thyristors are self-held by the holding current in the closed loop. Under this condition, the reference voltage $E_S$ is applied to the resistor $R_X$ to be measured through the reference resistor $R_S$. A voltage across the input terminal $V_{IN}$ of the detector DETR is thus given by:

$$V_{IN} = (R_X \cdot E_S + R_S \cdot n \cdot V_f)/(R_X + R_S) \quad (1)$$

where $V_f$ is a forward voltage drop of each of the crosspoint thyristors and $n$ is the number of stages of the channel.

Since the forward voltage drop $V_f$ is small such as in the order of 0.8 to 1 volt, it is possible to design the circuit parameters to meet the relation of $R_X \cdot E_S >> R_S \cdot n \cdot V_f$. Accordingly, $$V_{IN} \approx (R_X/R_X + R_S) \cdot E_S \quad (2)$$

$$R_X \approx (V_{IN}/E_S - V_{IN}) \cdot R_S \quad (3)$$

Thus, by detecting the input terminal voltage $V_{IN}$ by the detector DETR and making the calculation while putting the magnitudes of the reference voltage $E_S$ and the resistor $R_S$, the resistance $R_X$ to be measured can be determined. In a simpler way, it can be measured by merely connecting an ohm meter to the measuring terminal 11. It should be noted here that the constant current circuit 20 does not affect to the measurement system because it is floating. Of course, the cross-point thyristors do not affect the measurement system because the gate drive currents therefor are not flowing.

Referring now to FIG. 2(b), the capacitance measurement is explained. Like in FIG. 2(a), 11 and 13 designate test terminals to which a test trunk for the capacitance measurement CTS is connected. The capacitance measurement line test trunk CTS comprises the floating constant current circuit 20, the reference voltage source $E_S$, the reference resistor $R_S$, a reference capacitor $C_S$, a switching contact $t$, and a capacitance detector DETC. $C_X$ designates a capacitance to be measured, that is, a subscriber line capacitance. In operation, like in the resistance measurement in FIG. 2(a), the capacitance measurement line test trunk CTS is connected through the self-holding crosspoint thyristors and then the capacitor $C_X$ to be measured is charged by the reference voltage $E_S$ through the reference resistor $R_X$. After the capacitor $C_X$ to be measured has been fully charged to $E_S$ volts, the switching contact $t$ is actuated to move the charge in the capacitor $C_X$ to be measured to the reference capacitor $C_S$. Assuming that $n \cdot V_f << E_S$, a voltage across the input terminal of the capacitance detector DETC after a balanced condition has been reached is given by:

$$V_{IN} \approx (C_X/C_X + C_S) \cdot E_S \quad (4)$$

$$C_X \approx (V_{IN}/E_S - V_{IN}) \cdot C_S \qquad (5)$$

Thus, by detecting the voltage $V_{IN}$ across the input terminal by the capacitance detector DETC, the capacitance $C_X$ to be measured can be determined.

Finally, the measurement of external current is explained. Referring to FIG. 2(c), $I_X$ designates a current to be measured, and ITS designates an external current measuring circuit which comprises the floating constant current circuit 20 and an external current detector DETI. Like in the resistance measurement in FIG. 2(a), the external current measuring circuit ITS is connected through the self-holding crosspoint thyristors to cause the current $I_X$ to be measured to flow through the current detector DETI for the measurement of the current. In a simpler way, an ammeter may be merely connected to the test terminal 11. Since the constant current circuit 20 is floating, it does not affect the measurement system. Also, the forward voltage drop $V_f$ of the crosspoint 13 of the test vertical is sufficiently small such as in the order of 0.8 – 1 volt or smaller and hence it does not pose a problem.

As described hereinabove, according to the embodiment of FIGS. 2(a) through (c), it is possible to connect the subscriber line to the measuring circuit irrespective of the magnitude of the impedance of the subscriber line, and since the gate drive currents for the thyristors forming the channel are zero during the measurement, the effect by the gate drive current can be completely eliminated. Accordingly, the measurement error involved only depends on the difference among the forward voltage drops of the crosspoint thyristors in the stages involved in the channel network. Thus, by selecting a sufficiently high test voltage, the test of the subscriber line can be conducted with a substantially sufficient accuracy (e.g. less than 5 – 10% error).

FIGS. 3(a) and (b) show another embodiment of the present invention which has eliminated the effect of the forward voltage drop of the crosspoint thyristor.

FIG. 3(a) shows a circuit diagram for measuring a resistance to ground. The difference from FIG. 2(a) is the insertion of a closed circuit of level shifting elements 21 for compensating for a forward voltage drop developed at the channel switching devices and a floating current source 22 for the elements 21 between the test terminal 11 and the resistance detector DETR. The remaining portions are the same as in FIG. 2(a). While diodes are used in the illustrated embodiment as the level shifting elements 21 for compensating for the forward voltage drop, thyristors similar to the cross-points 8 to 10 or zener diodes or the like may be used. The compensating elements are poled such that the voltage developed across the compensating elements 21 is in opposite direction to the forward voltage drop $V_F = nV_F$ of the switching devices in the channel network NW.

As described in connection with FIG. 2(a), after two paths have been selected between the trunk terminals or test terminals 11, 13 and the subscriber terminal 7, the paths are held by a current supplied from the constant current source 20, and then the gate current for the paths is terminated and a voltage is applied from the reference voltage source $E_S$ through the reference resistor $R_S$ and the network NW to the subscriber line 14 for sensing the resistance $R_X$ to be measured. In this case, since the forward voltage drop $V_F$ across the crosspoint switches 14b to 16b in the channel network NW is cancelled by the forward voltage drop $V_F$ of the compensating elements 15, the second term shown in the numerator of the formula (1) becomes zero and the measurement free from an error due to the forward voltage drop of the crosspoint switches 8 to 10 can be attained. When the subscriber line test is conducted from the terminal 13, the polarity of the compensating elements 21 and the constant current source 22 are reversed to the example shown in FIG. 3(a). When a resistance is to be measured, diodes or zener diodes may be used as the level shifting elements and the test terminal 11 or 13 is selected such that a resistance test current flows through the crosspoint switches 14a to 16b in the direction opposite to the current supplied from the constant current source 20 to the crosspoint switches 14a to 16b. In this manner, the constant current circuit 22 may be eliminated.

FIG. 3(b) shows a circuit diagram for the external current measurement. In this case, again, the closed circuit of the compensating elements 21 and the floating current source 22 is inserted between the test terminal 11 and the current detection circuit DETI. As a result, since the forward voltage drop $V_F$ across the crosspoint switches 14b to 16b in the network NW is cancelled by a constant current supplied from the constant current source 22 to the compensating elements 21, the external current $I_X$ can be sensed with a small error irrespective of the polarity of the external current $I_X$, even if the voltage $V_X$ of the external current source is small.

As described hereinabove, according to the embodiment shown in FIGS. 3(a) and (b), the error in testing the subscriber line which is introduced by the semiconductor channel elements can be substantially completely eliminated. An experiment showed that in the resistance measurement of FIG. 3(a) under the conditions of $E_S = 35$ volts, $R_S = 5$ KΩ, $R_X = 1$ KΩ to 100 KΩ, the error in voltage reading at the resistance detection circuit DETR was less than 0.1 volt, which poses no appreciable practical problem. When elements similar to the crosspoint switches 14a to 16b are used as the compensating elements 15, less consideration need be paid for the temperature characteristic.

FIGS. 4(a), (b) and (c) show a further embodiment of the present invention, in which in place of the test channel 14b-15b-16b in FIGS. 2(a), (b) and (c), the line terminal 7 is connected to the test terminal 11 by test vertical crosspoint 18 provided for each of the subscriber lines. A test vertical is the vertical path of a specific switch accomodating a talking subscriber for establishing an interruption connection. Since the operation of the present embodiment is identical to that explained in connection with FIGS. 2(a), (b) and (c) where $n = 1$, it is omitted here.

Because the test vertical can also be used, in addition to test the subscriber line, to test the channel network and in the interruption channel, and the switch thereof is constructed by a semiconductor integrated circuit, the addition of the test vertical does not bring about appreciable increase of cost.

What is claimed is:

1. A subscriber line testing system comprising:
   a. a channel network having a first channel including a line terminal, first and second trunk terminals and at least one current self-holding semiconductor switching device connecting said line terminal with said first trunk terminal, and a second channel including at least one current self-holding semiconductor switching device for connecting said line terminal with said second trunk terminal;

b. a subscriber line connected to said line terminal; and c. a line test trunk including a floating current source connected to said first and second trunk terminals and a test circuit connected to said second trunk terminal.

2. A subscriber line testing system according to claim 1, wherein said second channel is an interruption channel to the subscriber, which interruption channel provides a connecting path for establishing double connections between a talking subscriber and a test subscriber line.

3. A subscriber line testing system according to claim 2, wherein said interruption channel is a test vertical of a prescribed switch with accomodates a talking subscriber for establishing an interruption connection.

4. A subscriber line testing system according to claim 1 wherein said test circuit of the line test trunk includes a resistor having its one end connected to said second trunk terminal, a D.C. power supply connected to the other end of said resistor, and a measuring circuit connected to said one end of said resistor.

5. A subscriber line testing system according to claim 1 wherein said test circuit of said line test trunk includes a resistor having its one end grounded through a D.C. power supply, a capacitor having its one end grounded, a switching contact for selectively connecting the other end of either one of said resistor and said capacitor to said second trunk terminal, and a voltage measuring circuit connected to said one end of said capacitor.

6. A subscriber line testing system according to claim 1 wherein said test circuit is a current measuring circuit connected to said second trunk terminal.

7. A subscriber line testing system according to claim 1 wherein a voltage compensation means for compensating for a voltage drop in said second channel is provided between said second trunk terminal and said test circuit.

8. A subscriber line testing system according to claim 7 wherein said voltage compensation means includes a parallel circuit of a semiconductor device having a similar forward voltage drop to that of the semiconductor switching device in said second channel and a second constant current source for feeding a forward current through said semiconductor device.

* * * * *